April 21, 1925.

W. M. FULTON

GATE VALVE

Filed Dec. 19, 1921

Inventor

Weston M. Fulton

By Mauro, Cameron, Lewis + Massey

Attorneys

April 21, 1925.
W. M. FULTON
GATE VALVE
Filed Dec. 19, 1921
1,534,513
3 Sheets-Sheet 2
Fig. 5.
Fig. 2.
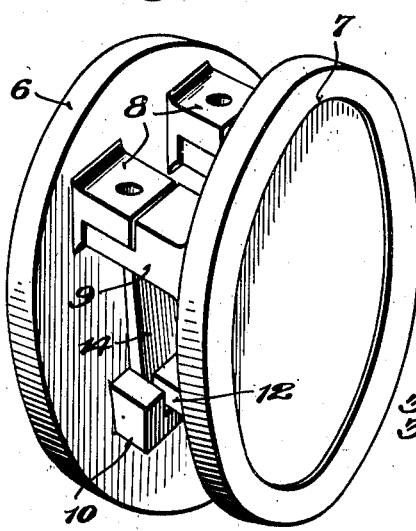
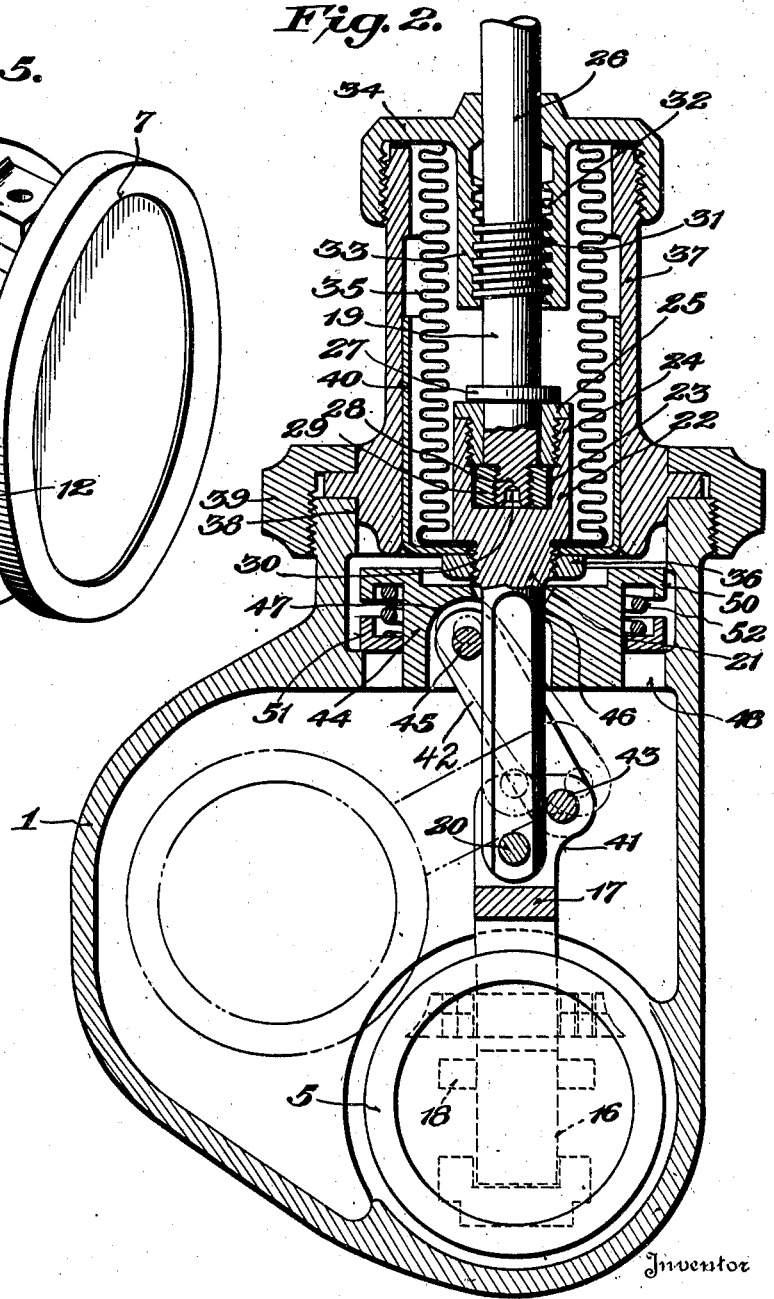
Inventor
Weston M. Fulton
By Mauro, Cameron, Lewis & Kerkam
Attorneys April 21, 1925.

W. M. FULTON 1,534,513

GATE VALVE

Filed Dec. 19, 1921

Inventor
Weston M. Fulton
BY
Mauro, Cameron, Lewis & Massey
Attorneys

Patented Apr. 21, 1925.

1,534,513

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

GATE VALVE.

Application filed December 19, 1921. Serial No. 523,410.

*To all whom it may concern:*

Be it known that I, WESTON M. FULTON, a citizen of the United States, and a resident of Knoxville, Tennessee, have invented new and useful Improvements in Gate Valves, which invention is fully set forth in the following specification.

This invention relates to gate valves and, more particularly, to the operating mechanism thereof.

Gate valves are especially adapted for service where it is desired that the valve member offer the least possible restriction to the flow of the fluid and, to this end, the valve member is ordinarily moved transversely of the axis of its seat until it entirely frees the opening through the latter. This requires a relatively extensive movement of the valve member, particularly where the valve is employed to control the flow of relatively large volumes of fluid. The character of the operating mechanism heretofore employed to effect this relatively extensive movement of the valve member has rendered it impractical, if not impossible, to make gate valves of the so called "packless" type i. e. to employ a flexible wall as a fluid tight connection between the valve operating-member and its housing in place of a packing gland or stuffing box to prevent leakage around said operating member. It is an object of this invention to provide a gate valve with operating mechanism whereby a flexible wall may be employed as a fluid tight connection between the valve operating-member and its housing.

A further object of this invention is to provide operating mechanism for a gate valve whereby limited axial movement of a valve operating member will effect a relatively large movement of the valve member laterally of the axis of its seat.

Another object of this invention is to provide operating mechanism for a gate valve which is particularly adapted for use with a valve member comprising loosely-connected disks and which is so constructed that a limited axial movement of the valve operating member in the direction of opening or closing the valve will first relieve the valve member from forced contact with its seat or seats and then move said valve member laterally or, conversely, move the valve member laterally into alignment with its seat or seats and then force said valve member into engagement with the same.

Another object of this invention is to provide a gate valve and operating mechanism therefor of the character heretofore described provided with a flexible wall as the fluid tight connection between said operating mechanism and its housing. Other objects will appear as the description of the invention proceeds. Stated broadly, the invention comprises a gate valve including, in combination with the housing, a valve member and operating mechanism therefor which is so constructed that it may be provided with a flexible wall to form a fluid tight connection between said operating mechanism and said housing. In its preferred embodiment, said invention comprises an axially-movable valve-operating member and connections between said operating member and the valve member whereby axial movement of the former through a relatively short distance produces a relatively large movement of the valve member laterally of the axis of its seat. While any suitable form of valve member may be employed, a valve member which may be wedged or otherwise forced into locking engagement with its seat or seats is preferred and, in this event, the present invention provides that the operating means for the valve member may have an initial opening and final closing movement in the direction of its axis to relieve said valve member from its forced engagement with its seat or seats or to force said valve member into engagement with its seat or seats, respectively. Furthermore, while the valve operating mechanism of this invention is particularly designed to make possible the use therewith of a flexible wall as a fluid tight connection between the operating mechanism and its housing, the valve operating mechanism of the present invention is also capable of use without such a flexible wall and such use is contemplated within the present invention.

This invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same reference characters are employed to designate corresponding parts in the several figures:

Fig. 2 is a section of the valve and its operating mechanism taken at right angles to the section of Fig. 1;

Figure 1:
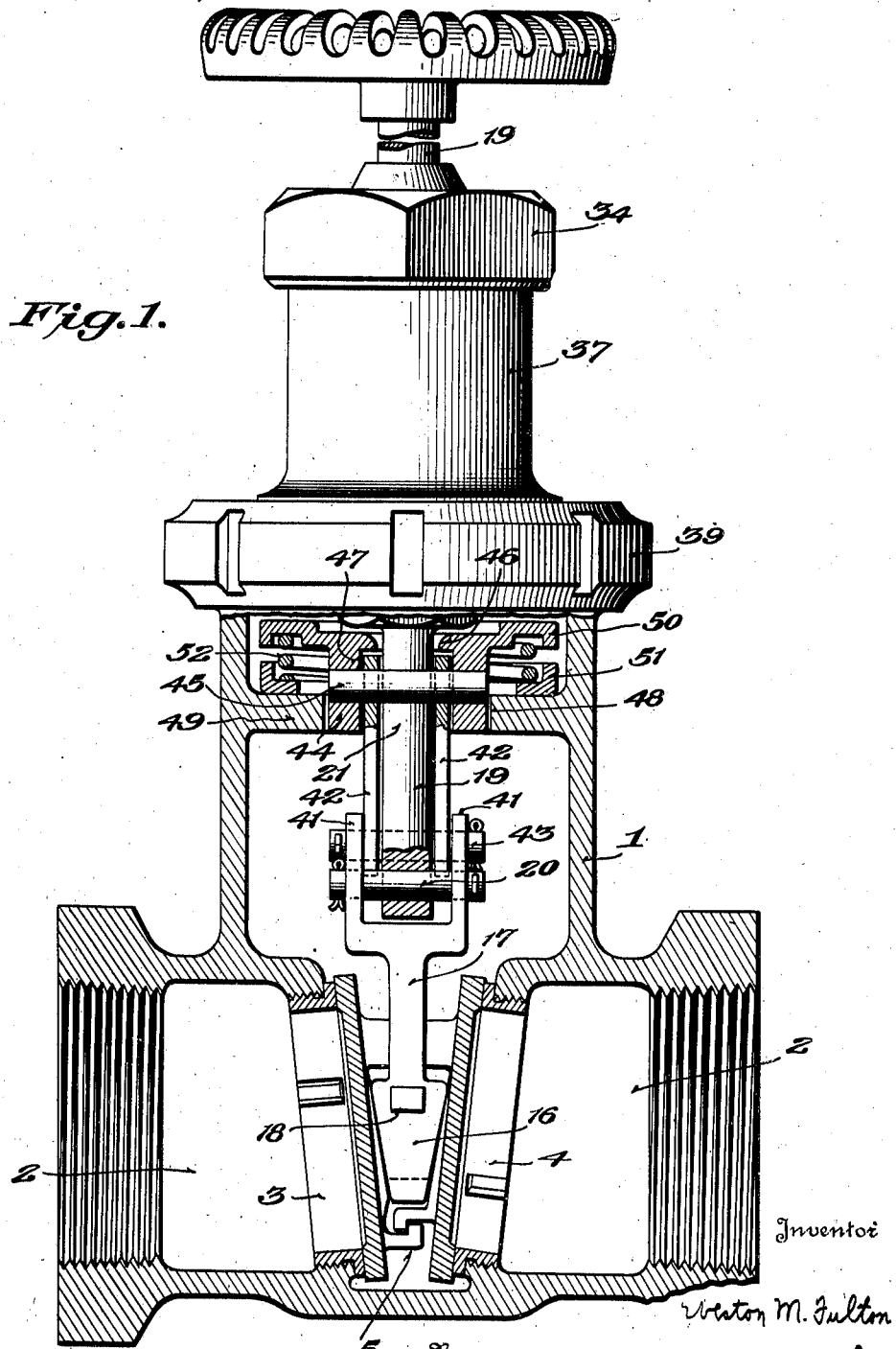
Fig. 1 is an elevation partly in section of a gate valve embodying the present invention.

In the form shown in Figs. 1 and 5, a valve housing 1 of any suitable construction is provided with inlet and outlet passages 2, shown as threaded for reception of suitable pipe joints or unions. Within said valve housing is provided a valve seat or seats of any suitable form, but in the preferred embodiment of the invention I employ opposed valve seats 3 and 4 which, in order that the valve member may have wedging or forced engagement with said seats, are suitably inclined to the axis of the passage through the housing as shown.

Figure 3:
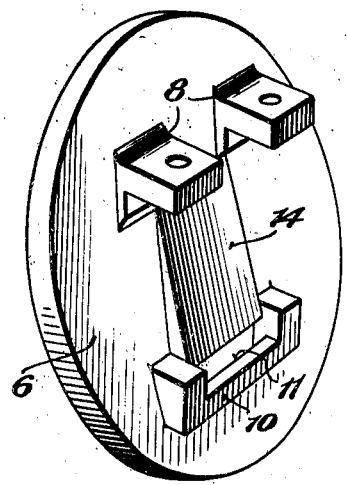
Fig. 3 is a perspective of one of the valve disks.
Figure 4:
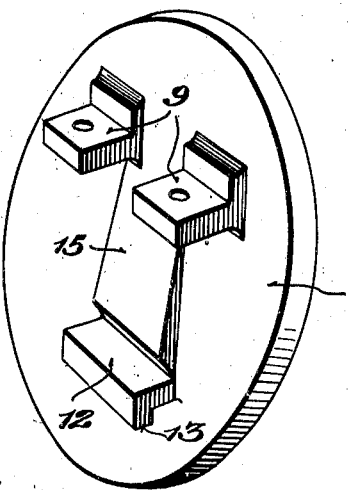
Fig. 4 a perspective of the other valve disk, and Fig. 5 a perspective of the assembled valve disks of Figs. 3 and 4.

Positioned within said housing for co-operation with said valve seats 3 and 4 is a valve member, generally designated 5, which is so constructed as to be capable of forced or wedged engagement with said valve seats 3 and 4. Said valve member may be of any suitable construction, but I prefer to make the same of separable, loosely-connected disks which may seat themselves independently under the action of a wedging or spreading device. The valve member illustrated (see particularly Figs. 3 to 5) is composed of two valve disks 6 and 7 respectively of such size as to suitably close the ports through the valve seats 3 and 4. Valve disk 6 is provided with a pair of rearwardly extending apertured lugs 8, and valve disk 7 is provided with a similar pair of lugs 9 designed to mate with the aforesaid lugs 8. Valve disk 6 is also provided with a rearwardly extending socket piece 10 affording a slot or groove 11, and valve disk 7 is provided with an L-shaped member 12 the depending rib 13 of which is designed to engage in said groove 11 and form a loose interlocking connection between the valve disks as shown in Fig. 1. In assembling the valve disks the rib 13 is engaged in the groove 11 and the mating lugs 8 and 9 are positioned in overlapping relationship as shown in Fig. 5, and loose pins are then inserted through the mating apertures in said lugs. Thereby the valve disks are loosely connected so that they may be moved into and out of engagement with their seats as a unit, but the disks 6 and 7 may move each with respect to the other so as to seat itself properly on its corresponding valve seat 3 or 4.

Each of the valve disks 6 and 7, in the form shown, is also provided with a raised inclined surface, 14 and 15 respectively, for cooperation with the wedge-shaped head 16 of an actuating member 17. In order that the head 16 may not be withdrawn from between the valve disks 6 and 7 during the opening of the valve, said head may also be provided with suitable projections 18 to engage the mating lugs 8 and 9 and carry the assembled valve disks with the member 17. Said lugs 18 may be supplied in any suitable way, as by forming the same integral with the head 16 or by passing a cotter or other suitable pin through an aperture formed in said head.

Member 17 is pivotally connected in any suitable way to a valve operating member or stem 19, said member 17 being shown as bifurcated at its outer end to embrace the end of the stem 19 and a cotter pin 20 being passed through the end of the stem 19 and the arms of the bifurcation to afford a pivotal connection between the member 17 and the stem 19. Valve stem 19 may be of any suitable construction for actuating the member 17 and the valve disks carried thereby. In the form shown, said stem 19 is composed of two sections, an inner section 21 enlarged at its outer end 22 to provide a socket 23, which socket is enlarged and threaded at its outer end 24 to receive the threaded collar 25; and an outer section 26 provided with a flange 27 to engage the collar 25, the inner end of said section extending through the collar 25 and being provided with a reduced threaded end 28 to receive the nut 29. The section 26 is passed through the collar 25 until the flange 27 engages said collar and the nut 29 is then threaded onto the reduced end 28 until it also engages said collar—in which position it may be locked in any suitable way as by a rivet 30. The collar 25 is then threaded into the socket 23 in the enlarged end 22 of the inner section 21; thereby the outer section 26 is locked to the inner section 21 so that the two move axially as a unit but the outer section 26 may rotate with respect to the inner section 21.

Any suitable means may be provided for effecting an axial movement of the compound valve stem 21, 26. In the form shown, the outer section 26 is provided with an exterior thread 31 coacting with an interior thread 32 on an interiorly projecting sleeve 33 formed integrally with the cap nut 34. Said valve stem 21, 26 may be provided with any suitable means for operating the same, as a hand wheel on its outwardly projecting end as illustrated in Fig. 1.

In the preferred embodiment of the present invention, a flexible wall is interposed between the valve stem and the housing to provide a fluid tight connection therebetween and thereby eliminate the necessity for packing glands or stuffing boxes. In the form shown, a flexible wall 35 of any suitable construction, shown as a corrugated expansible and contractible metal wall of tubular formation, is suitably clamped at one end to the valve stem and at its opposite end to the valve housing. These connections may be effected in any suitable way, one end of the wall 35 being shown as securely clamped to the enlargement 22 of the inner section of the valve stem by a ring nut 36 and the other end of said flexible wall 35 being shown as securely clamped to the bonnet portion 37 of the valve housing by the aforesaid cap nut 34 threaded onto said bonnet portion. Said bonnet portion 37 is shown as received within an aperture 38 in the body portion of the housing and clamped in position by the threaded bonnet ring 39, but any other suitable construction may be employed, if desired.

In order to prevent the rotation of the outer section of the valve stem tending to rotate the flexible wall 35, and thereby exert a torsional strain thereon which might cause rupture thereof, said wall is preferably provided with a cup-shaped guiding member 40 which fits and may slide axially in the bore of the bonnet member 37, but which is provided with suitable means, as one or more ribs adapted to engage in a corresponding groove or grooves in said bonnet member, to prevent relative rotation therebetween. Said cup-shaped guide member 40 may be secured to the flexible wall 35 in any suitable way, as by clamping the same with the inner end of said wall between the enlargement 22 on the inner section of the valve stem and the ring nut 36.

In conformity with the present invention the connection between the valve stem and the valve member includes or has cooperating therewith means whereby the axial movement of the stem effects a lateral movement of the valve member. Said means may take a variety of forms, that shown in Figs. 1 to 5 comprising a transverse projection 41 on the actuating member 17, whereby the latter takes the form of a bell-crank lever at its upper yoked end; links 42 pivotally connected to the projections 41 in any suitable way, as by cotter pins 43; and an abutable member 44 to which the links 42 are pivoted in any suitable way, as by a cotter pin 45. Said abutment member 44 is shown as centrally apertured at 46 to permit the inner section 21 of the valve stem 19 to pass therethrough, and as recessed at 47 to receive the outer ends of the links 42. Said abutment member also preferably provides means for preventing transmision to the valve member of any tendency to rotation because of the rotation of the outer section 26 of the valve stem. This may be accomplished in any suitable way; in the form shown, the abutment member 44 is made of generally rectangular form and received in a correspondingly shaped aperture 48 in a partition wall 49 suitably provided in the interior of the valve housing 1. Owing to the rectangular conformation of the block 44 and the aperture 48, rotation of the block around its own axis is prevented. It is to be expressly understood, however, that any other suitable means may be employed for preventing rotary movement being transmitted from the outer section of the valve stem to the inner section thereof, the valve member or their intermediate or cooperating parts. The aperture 48 is also preferably made of such size as to permit the assembled valve disks 6 and 7 to be passed therethrough into cooperative relation with the valve seats 3 and 4.

In order that the valve member or its actuating means may have an initial movement in the direction of the axis of the valve stem when the latter is operated to open the valve, and a corresponding final movement in the direction of the axis of the valve stem at the end of the closing movement of the valve, so that the valve member may be relieved from engagement with its seats before it is moved laterally or forced into engagement with its seats after it is moved into alignment with the same, the abutment member 44 is made movable in the direction of the axis of the valve stem. In the form shown, the abutment member 44 is provided with a radially extending flange 50 between which and an annular guide member 51 a coil spring 52 is interposed, and which is spaced from the inner end of the bonnet member 37, so that, when assembled as shown in Figs. 1 and 2, the abutment member 44 may have a limited movement from its intermediate position in either direction along the axis of the valve stem.

In operation, rotation of the outer section of the valve stem 26 in a direction to open the valve causes axial outward movement thereof owing to the coaction of the threads 31 and 32. This axial outward movement of the section 26 is transmitted to the inner section 21 of the valve stem but, owing to the character of the connection between said sections, the rotary movement of the outer section is not transmitted to the inner section. Outward axial movement of the inner section 21 carries therewith the actuating member 17 in the direction of the axis of the valve stem, as well as the links 42 and abutment member 44, until the flange 50 of the latter member engages the inner end of the bonnet member 37, or any other suitable stop similarly located. This axial outward movement of the member 17 withdraws the wedge shaped head 16 from the inclined surfaces 14 and 15 on the valve disks 6 and 7, and thereby relieves said disks from locking contact with the valve seats 3 and 4. When the abutment member 44 engages the inner end of the bonnet member 37, however, it can not be moved further in an axially outward direction and therefore further axially outward movement of the stem section 21 causes the links 42 to pivot about the pin 45 and the actuating member 17 to pivot with respect to said links about the pin 43 and with respect to the stem section 21 about the pin 20. This causes the member 17 to move laterally by an amount which is greatly magnified with respect to the axial movement of the valve stem. During this lateral movement of the member 17, the valve disks 6 and 7 are carried therewith to the dotted line position shown in Fig. 2, the valve disks being prevented from slipping off of the head 16 by the engagement of the lugs 18 with the mating lugs 8 and 9.

Conversely, when the upper section 26 of the valve stem is rotated in a direction to close the valve, the inner section 21 of said stem is moved axially inward to swing the actuating member 17 about its pivots until the valve disks 6 and 7 are in alignment with their seats. Further lateral movement being prevented, further inward movement of the stem section 21 moves the actuating member 17 in the direction of the axis of the valve stem until its head 16 wedges the valve disks 6 and 7 into engagement with their seats 3 and 4 owing to the coaction of the faces of said head 16 with the inclined surfaces 14 and 15 on said disks. During this latter movement of the actuating member 17, the links 42 draw the abutment member 44 inwardly against the tension of the spring 52.

The flexible wall 35 being securely connected to the valve stem and the valve housing at its opposite ends, it affords a fluid tight partition within the housing to prevent the escape of fluid from the valve housing and thereby renders unnecessary the use of packing glands or stuffing boxes. This flexible wall cannot be twisted owing to the rotation of the outer section of the valve stem 26 because of the coaction of its guide member 40 with the bonnet member 37 while, at the same time, said guide member permits the flexible wall 35 to expand and contract in conformity with the movement of the valve stem. The rotary movement of the outer section 26 of the valve stem is also prevented from transmission to the valve member and its associated parts owing to the coaction of the abutment member 44 with the aperture 48 in the partition 49.

Figure 6:
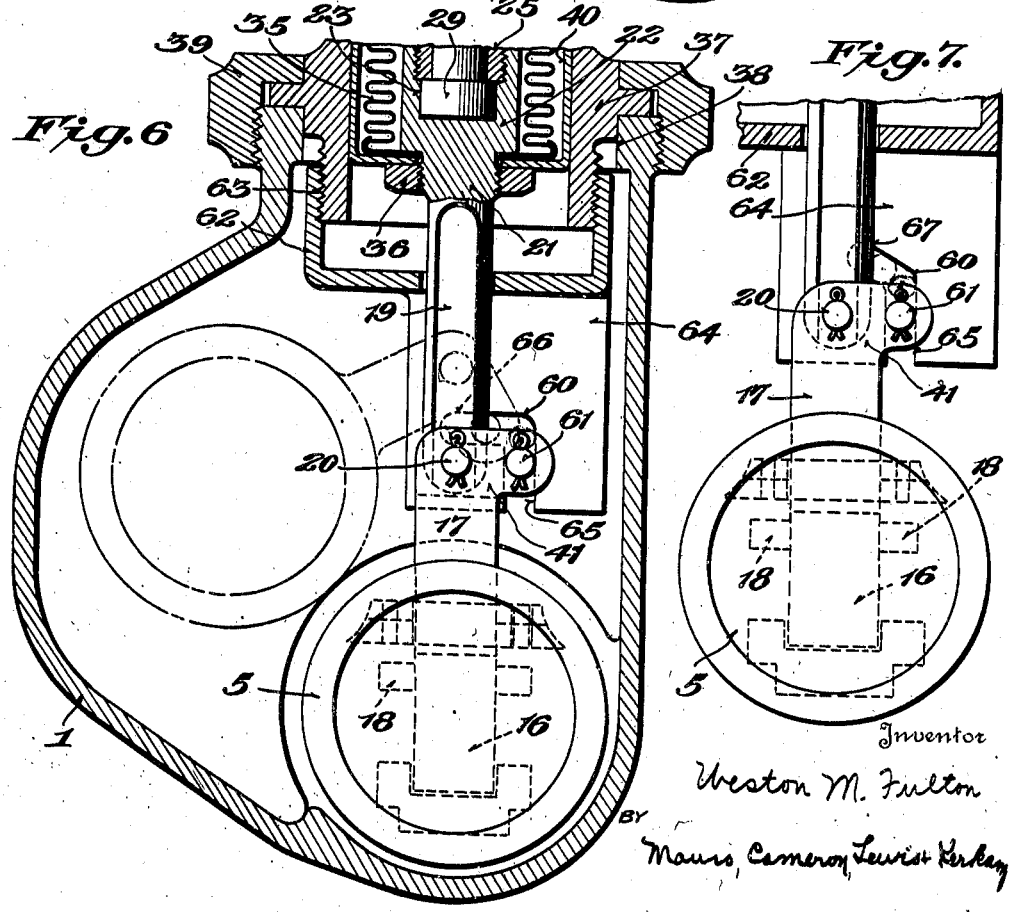
Fig. 6 is a fragmentary section corresponding to Fig. 2 illustrating another embodiment of the present invention.

It is not essential to this invention, however, that the actuating member 17 be provided with links and an abutment member, because any other suitable means may be provided to effect such a movement of the member 17 as has been herein described. Thus, in place of the links and abutment member, suitably fixed guides may be provided for the pins 43 so as to cause the member 17 to have such a movement as above described. Also, as shown in Fig. 6, fixed guide slots 60 may be provided for cooperation with a suitable pin, as a cotter pin 61, mounted in the transverse projection 41 of the actuating member 17. Said guide slots may be provided in the wall of the valve housing itself or, as shown in Fig. 6, an auxiliary sleeve-like member 62, provided with an interior thread 63 whereby the same may be threaded onto the lower end of the bonnet member 37, may be provided with inwardly projecting walls 64 in which the slots 60 are formed. In order that the valve member or its actuating element may have initial and final movements in the direction of the axis of the valve stem to relieve the valve member and wedge it into engagement with its seats as heretofore described, the slot 60 is preferably provided with an axially extending portion 65 which at its end communicates with a laterally or transversely extending section 66. In the form shown in Fig. 6, this latter portion of the slot extends at right angles to the section 65 of said slot, but such is not essential, as the laterally or transversely extending section of said slot may extend at an oblique angle as shown at 67 in Fig. 7, or it may be curved or given any other suitable configuration to cause the valve actuating member 17 to have the character of movement heretofore described.

Figure 7:
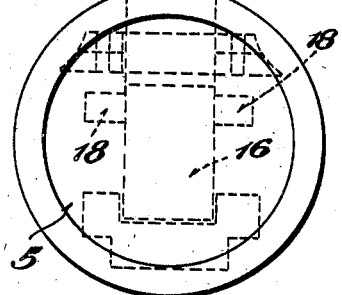
Fig. 7 is a fragmentary section of a further embodiment of the present invention.

In operation of the construction shown in Figs. 6 and 7, axially outward movement of the stem section 21 causes a corresponding movement of the member 17 to relieve the valve disks 6 and 7 until the pin 61 reaches the end of the axially extending section 65 of the slot 60. Further axial outward movement of said stem section 21 causes the member 17 to pivot with respect to said section 21 on its pin 20, the character of this latter movement being determined by the form of the transversely extending section 66, 67 etc. of the slot 60. During this latter portion of its movement the valve member is swung laterally by an amount which is relatively large as compared with the axially outward movement of the valve stem. In closing the valve, the movements are reversed and the valve disks finally forced into firm engagement with their seats by the wedging action of the head 16 on the inclined surfaces 14 and 15.

Other constructions may be employed to effect lateral movement of the valve member, either with or without a preliminary axial movement thereof to relieve and force the same from and into engagement with its seat or seats. Thus the transverse projection 41 or the pin carried thereby may be provided with gear teeth for coaction with teeth on the edge of the guide slot 60. Also, rollers may be mounted on the ends of said pin to reduce the friction between the same and the walls of the slots. Also, while circular pins for coaction with said slots have been illustrated, said pins may be made of rectangular or any other suitable cross section if desired.

It will therefore be perceived that a gate valve has been provided with operating mechanism whereby a relatively small axial movement of an operating member effects a relatively large lateral movement of the valve member so that the valve member may be moved to fully clear the valve ports, even in large sized valves, by only a relatively small axial movement of the operating means. Therefore, a flexible wall may be employed as a fluid tight connection between the valve operating member and its housing owing to the limited extent to which said operating member need be moved to effect the opening and closing movements of the valve member. Moreover, operating mechanism for a gate valve has been provided whereby the valve member may be initially relieved from its seat or seats, or finally pressed into firm contact therewith, by an axial movement of its actuating member before and after, respectively, the rapid lateral movement of the valve member.

While the illustrated embodiments of the invention have been described with considerable particularity, it is to be expressly understood that the invention is not limited thereto, as the same is capable of receiving a variety of mechanical expressions, some of which will now readily suggest themselves to those skilled in the art. Moreover, certain features of the invention may be used without other features thereof, and changes may be made in the details of construction, arrangement and proportion of parts without departing from the spirit of this invention. Reference is therefore to be had to the appended claims for a definition of the limits of said invention.

What is claimed is:

1. In a gate valve, the combination of a valve housing, opposed inclined valve seats therein, a wedge-shaped valve member for wedging engagement with said inclined seats, a valve stem, a motion-multiplying connection between said valve and stem swinging said valve laterally of said stem and transversely to the axis of said seats, and a flexible member providing a fluid-tight connection between said stem and housing.

2. In a gate valve, the combination of a valve housing, a valve member therein, an axially-movable valve stem, means connecting said stem and valve member and tending to move said member axially with said stem, and means cooperating with said last-named means to swing said valve member transversely of the axis of its seat as said valve stem moves axially.

3. In a gate valve, the combination of a valve housing, a valve member therein, an axially-movable valve stem, a flexible wall providing a fluid-tight connection between said valve stem and said housing, means connecting said stem and valve member and tending to move said member axially with said stem, and means cooperating with said last-named means to swing said valve member transversely of the axis of its seat as said valve stem moves axially.

4. In a gate valve, the combination of a valve housing, a valve member therein, an axially-movable valve stem, a flexible wall providing a fluid-tight connection between said valve stem and said housing, means connecting said stem and valve member and tending to move said member axially with said stem, and means cooperating with said last-named means to swing said valve member laterally after an initial movement relieving said member from its seat as said stem is operated to open the valve.

5. In a gate valve, the combination of a valve housing, a valve member therein, an axially movable valve stem, means connecting said stem and valve member for moving said valve member into and out of engagement with its seat, and means cooperating with said last-named means for moving said valve member transversely of the axis of said seat after said member is relieved from its seat as said stem is operated to open the valve.

6. In a gate valve, the combination of a valve housing, a valve member therein comprising loosely-connected discs, a longitudinally movable valve stem, connections between said stem and valve member including means for wedging said discs into engagement with their seats, and means cooperating with said connections whereby said wedging means is first relieved from said discs and said discs thereupon moved laterally of said stem as said stem is operated to open the valve.

7. In a gate valve, the combination of a valve housing, a valve member therein comprising loosely-connected discs, a longitudinally movable valve stem, connections between said stem and valve member including means for wedging said discs into engagement with their seats, and means cooperating with said connections for moving said valve member laterally of said stem.

8. In a gate valve, the combination of a valve housing, a valve member therein comprising loosely-connected discs, a valve stem, connections between said stem and valve member including means for wedging said discs into engagement with their seats, and means, coacting with said connections whereby after a predetermined movement relative to said discs said connections move said valve member laterally of the valve stem as said stem is operated to open the valve.

9. In a gate valve, the combination of a valve housing, a valve member therein, a valve stem, a flexible wall providing a fluid-tight connection between said valve stem and housing, means connecting said stem and valve member for moving said valve member into and out of engagement with its seat, and means cooperating with said last-named means for moving said valve member laterally of said stem after said member is relieved from its seat as said stem is operated to open the valve.

10. In a gate valve, the combination of a valve housing, a valve member therein comprising loosely-connected disks, a valve stem, a flexible wall providing a fluid-tight connection between said valve stem and housing, connections between said stem and valve member including means for wedging said disks into engagement with their seats, and means cooperating with said connections whereby said wedging means is first relieved from said disks and said disks thereupon moved laterally of stem as said stem is operated to open the valve.

11. In a gate valve, the combination of a valve housing, a valve member therein comprising loosely-connected disks, a valve stem, a flexible wall providing a fluid-tight connection between said valve stem and housing, connections between said stem and valve member including means for wedging said disks into engagement with their seats, and means cooperating with said connections for moving said valve member laterally of said stem.

12. In a gate valve, the combination of a valve housing, a valve member therein comprising loosely-connected disks, a valve stem, a flexible wall providing a fluid-tight connection between said valve stem and housing, connections between said stem and valve member including means for wedging said disks into engagement with their seats, and means coacting with said connections whereby after a predetermined movement relative to said disks said connections move said valve member laterally of the valve stem as said stem is operated to open the valve.

13. In a gate valve, the combination of a valve housing, a wedge-shaped gate valve member therein, a rotatable and axially movable valve stem, connections between said stem and said valve member whereby axial movement of said stem swings said valve member laterally of said stem, and means to prevent rotation of said valve member by the rotation of said stem.

14. In a gate valve, the combination of a valve housing, a valve member therein, a rotatable and axially movable valve stem, connections between said stem and said valve member whereby axial movement of said stem moves said valve member laterally of said stem, a flexible wall providing a fluid-tight connection between said valve stem and housing, and means for preventing rotation of said valve member and flexible wall by the rotation of said stem.

15. In a gate valve, the combination of a valve housing, a valve member therein, a valve stem, an intermediate member pivotally connected to said valve stem and loosely connected to said valve, and means cooperating with said intermediate member to move the same laterally at the same time that it moves axially under the action of said valve stem.

16. In a gate valve, the combination of a valve housing, a valve member therein, a valve stem, an intermediate member pivotally connected to said valve stem and loosely connected to said valve, and means cooperating with said intermediate member to move the same laterally as it moves axially under the action of said valve stem, said last-named means being operative except at the beginning of the opening and the end of the closing movement of said valve member.

17. In a gate valve, the combination of a valve housing, a valve member therein, a valve stem, a flexible wall providing a fluid-tight connection between said valve stem and housing, an intermediate member pivotally connected to said valve stem and loosely connected to said valve, and means cooperating with said intermediate member to move the same laterally at the same time that it moves axially under the action of said valve stem.

18. In a gate valve, the combination of a valve housing, a valve member therein, a valve stem, a flexible wall providing a fluid-tight connection between said valve stem and housing, an intermediate member pivotally connected to said valve stem and loosely connected to said valve, and means cooperating with said intermediate member to move the same laterally as it moves axially under the action of said valve stem, said last-named means being operative except at the beginning of the opening and the end of the closing movement of said valve member.

19. In a gate valve, the combination of a valve housing, a valve member therein, a rotatable valve stem, means coacting therewith whereby rotation thereof effects axial movement of said stem, and connections between said stem and valve member whereby axial movement of said stem swings said valve member transversely of the axis of its seat except at the beginning of the opening and the end of the closing movement of said valve member.

20. In a gate valve, the combination of a valve housing, a valve member therein, a rotatable valve stem, means coacting therewith whereby rotation thereof effects axial movement of said stem, a flexible wall providing a fluid-tight connection between said valve stem and housing, and connections between said stem and valve member whereby axial movement of said stem swings said valve member transversely of the axis of its seat except at the beginning of the opening and the end of the closing movement of said valve member.

21. In a gate valve, the combination of a valve housing, a valve member therein comprising loosely-connected valve discs, a valve operating member having connections with said valve member adapted to press said discs into engagement with their seats, and means cooperating with said connections for moving said valve member laterally of said operating member after an initial movement of said connections relieving said valve discs from their seats as the operating member is moved to open the valve.

22. In a gate valve, the combination of a valve housing, a valve member therein, a valve operating member, a flexible wall providing a fluid-tight connection between said valve operating member and said housing, and connections between said operating member and valve member whereby initial operation of the former to open the valve moves said connections axially with said operating member and further operation of said operating member moves said valve member laterally.

23. In a gate valve, the combination of a valve housing, a valve member therein comprising loosely-connected valve discs, a valve operating member having connections with said valve member adapted to press said discs into engagement with their seats, a flexible wall providing a fluid-tight connection between said valve operating member and said housing, and means cooperating with said connections for moving said valve member laterally of said operating member after an initial movement of said connections relieving said valve discs from their seats as the operating member is moved to open the valve.

24. In a gate valve, the combination of a valve housing, a valve member therein, a valve operating member, a flexible wall providing a fluid-tight connection between said valve operating member and said housing, a connecting member intermediate said operating member and valve member initially moved axially with the former as the same is operated to open the valve, and means cooperating with said intermediate member to move said valve member laterally after a predetermined axial movement of said connecting member.

25. In a gate valve, the combination of a valve housing, a valve member therein, a valve operating member, a flexible wall providing a fluid-tight partition between said operating member and said housing, and connections between said operating member and said valve member whereby movement of said operating member first moves said connections transversely of the axis of the valve seat and then moves said valve member in a different direction transversely of the axis of its seat.

In testimony whereof I have signed this specification.

WESTON M. FULTON.